United States Patent [19]
Vlajic et al.

[11] Patent Number: 5,720,910
[45] Date of Patent: Feb. 24, 1998

[54] PROCESS FOR THE PRODUCTION OF DENSE BORON CARBIDE AND TRANSITION METAL CARBIDES

[76] Inventors: Milan D. Vlajic; Vladimir D. Krstic, both of Department of Materials and Metallurgical Engineering, Queen's University, Nicol Hall, Kingston, Ontario, Canada, K7L 3N6

[21] Appl. No.: 507,594

[22] Filed: Jul. 26, 1995

[51] Int. Cl.$^6$ ............................ C01B 31/00; C04B 33/34; C04B 35/64; C04B 37/00

[52] U.S. Cl. .................... 264/29.1; 264/29.6; 264/676; 264/682

[58] Field of Search .................. 501/90, 91, 92, 501/96, 97, 98; 264/29.1, 60, 63, 29.6, 676, 682

[56] References Cited

U.S. PATENT DOCUMENTS

| | | | |
|---|---|---|---|
| 4,524,138 | 6/1985 | Schwetz et al. ........................ | 501/90 |
| 5,223,195 | 6/1993 | Kuwabara ............................... | 264/60 |
| 5,459,114 | 10/1995 | Kaya et al. ............................ | 501/96 |
| 5,482,673 | 1/1996 | Alexander et al. ..................... | 419/48 |

*Primary Examiner*—Donald E. Czaja
*Assistant Examiner*—Jacqueline A. Ruller

[57] ABSTRACT

A process of producing high density articles of boron carbide and all transition metal carbides that optionally contain 1 to 50% by volume of borides is disclosed. The process involves the steps of homogeneously mixing boron carbide, titanium oxide and carbon powders, or homogeneously mixing transition metal carbide with its oxide, boron carbide and carbon when sintering transition metal carbides, forming the powder mixtures into a shaped green body, and sintering the body in a controlled atmosphere at a temperature of from 1900° C. to 2100° C. The shaped articles thus obtained have the theoretical density of at least 95% and preferably greater than 99% of theoretical density of selected composite and flexural strength of at least 350 MPa, preferably grater than 450 MPa.

5 Claims, No Drawings

PROCESS FOR THE PRODUCTION OF DENSE BORON CARBIDE AND TRANSITION METAL CARBIDES

BACKGROUND OF THE INVENTION

1. Field of the Invention

The present invention relates to a composition and a process of manufacturing a sintered boron carbide and transition metal carbides having densities close to theoretical density and a strength equal to or higher than that of hot-pressed materials. More specifically, the invention relates to the process involving simultaneous sintering and conversion of boron carbide, transition metal carbides and oxides into borides in one step operation. Furthermore, it relates to the development of a microstructure with coarse, often elongated boride grains responsible for toughening of carbide matrix.

2. Description of the Prior Art

Boron carbide ($B_4C$) is the third hardest material known to man and is oxidation and reduction resistant up to approximately 1100° C. Also, it is inert to most chemicals, has a high cross section for neutron absorption, and is one-third the density of steel. Because of its high hardness it is useful in applications such as armour plating and the production of blasting nozzles, mechanical seal faces, and cutting and grinding tools.

Boron carbide exists in a broad range of compositions and its mechanical and electrical properties depend critically upon stoichiometry. For example, hardness and fracture toughness have been shown to be the highest at essentially the stoichiometric composition corresponding to the ratio B/C-4 (Communications of the American Ceramic Society, January 1984, C-13–C-14) decreasing rapidly with either excess of carbon or excess of boron component.

Despite the advantages described above, sintering of boron carbide bodies to high density is extremely difficult due to its high covalent bonding and low diffusivity even at temperatures exceeding 2200°–2300° C. So far the most successful sintering of boron carbide ceramics has been with the addition of elemental carbon either in a crystalline or amorphous state. Such method is described in U.S. Pat. No. 4,195,066 and involves moulding a mixture of submicron powders of boron carbide and carbon into a shaped green body, and then subjecting the body to pressureless sintering at temperatures of from 2100° C. to 2200° C. The articles produced by this method have the density of up to 96% of its theoretical density, an average grain size of not more than 10 μm, and a flexural strength of at least 300 MPa.

The other methods involve the addition of beryllium carbide to very fine boron carbide powder and then pressureless sintering at temperatures of from 2200° to 2280° C. (U.S. Pat. No. 4,005,235), or the additions of Al, Ni or $AlF_3$ which case the best densities were achieved with $AlF_3$ additive (Materials Science Research, Vol. 13. Edited by G. C. Kuczynski, Plenum Press, NY, 1980).

The strive to increase hardness and other mechanical properties has led to the development of boron carbide based composites, particularly with titanium diboride ($TiB_2$). For example, Japan Patent No. JP 60/235764 describes the process for the production of boron carbide-titanium boride composite by mixing titanium boride particles and boron carbide powder and then densifying at extremely high temperature to manufacture components of exceptional hardness. Recently, it has been shown that polycrystalline composites of $B_4C$—$TiB_2$ with densities exceeding 95% of theoretical can be obtained by pressureless sintering with the addition of 1 wt % iron (Fe) (Advanced Ceramic Materials, 3[1] 52–55, 1988).

It is thus apparent that boron carbide articles of up to 96% of theoretical density can be produced by the pressureless-sintering method only by using very high temperature of at least 2150°–2250° C. and with the strength of such articles seldom exceeding 350 MPa. It would be an improvement in the art if boron carbide ceramics can be sintered to high density without the application of external pressure at temperatures below 2100° C. and with the strength significantly higher then 350 MPa.

Titanium carbide (TIC) is an important material from the transition metal carbide group with great scientific and commercial value. It is widely used for cutting tool and wear resistant materials having high hardness and strength. High density TiC shapes can be produced from very fine powders using the hot-pressing technique (Journal of the American Ceramic Society, Vol. 65, No. 2, pp. 104, 1982). The articles produced by this method have strengths of up to 500 MPa, fracture toughness of up to 4 $MPa.m^{1/2}$, and hardness of 19 GPa.

Another transition metal carbide of great commercial value is tungsten carbide (WC). Sintering of tungsten carbide powders in the absence of external pressure (pressureless sintering) has been accomplished using cobalt (Co) as a sintering aid. This composite has the disadvantage in that the metallic cobalt has low melting temperature and, in the presence of oxygen, transforms into cobalt oxide, leading to degradation of mechanical properties at temperatures above room temperature. It would be of great technical and commercial value if WC can be sintered to high density without metallic additive so that the range of temperatures at which this carbide can be used safely may be increased.

BRIEF DESCRIPTION OF THE INVENTION

It is, therefore, the primary object of the present invention to provide a process for producing high density sintered shaped articles which are free of aforementioned and other such disadvantages.

It is another object of the present invention to provide a process for producing high density sintered shaped articles of polycrystalline boron carbide and transition metal carbides, to produce a product which has high flexural strength and fracture toughness, is dimensionally stable, consists essentially of only transition metal carbide and its boride, and can have a complex shape. Transition metal carbides are defined, for the purpose of this invention, as carbides of the following elements: Sc, Ac, Ti, V, Cr, Mn, Fe, Co, Ni, Os, Zr, Nb, Ru, Mo, Hf, Ta, W, Re, B and La.

The present invention provides a process for pressureless sintering of boron carbide and transition metal carbides, having densities in excess of 99% of its theoretical density and flexural strengths in excess of 480 MPa. Carbide body is densified with the help of liquid phase formed by the addition of from about 1 to about 50% by weight of $TiO_2$ and from about 0.1 to about 10% by weight of carbon when sintering boron carbide powder, or with the help of from about 0.1 to about 30% by weight of a selected transition metal oxide, from about 0.1 to about 40% by weight of boron carbide or boron containing compound, and from 0 to about 10% by weight of carbon included in the ceramic body when sintering transition metal carbide powders. In the course of sintering, part of the transition metal carbide is converted to boride while the entire amount of transition metal oxide added to the mix is converted to boride, forming a two phase composite structure consisting of a transition metal carbide phase and a boride phase.

A method for densifying transition metal carbides composites comprising (i) forming a homogeneous mixture of (a) boron carbide powder, titanium oxide powder in the range of from about 1% to about 50% by weight, and carbon from about 0.1% to about 10% by weight when sintering boron carbide, or (b) transition metal carbide powder, transition metal oxide powder in the range of from 0% to about 30% by weight, carbon powder in the range of from 0% to about 10% by weight, and boron carbide powder in the range of from about 0.1% to about 40% by weight, (ii) moulding and shaping the mixture using conventional techniques such as uniaxial or isostatic pressing, injection moulding, slip casting, tape casting, or extrusion, (iii) sintering the green body in an atmosphere which is either reducing or inert to transition metal carbide, or in vacuo, at a temperature within the range of from about 1800° to about 2200° C. to form an article having a density of the least 95% of the theoretical density of the composite.

DETAILED DESCRIPTION OF THE INVENTION

The dense sintered shaped articles of polycrystalline boron carbide and transition metal carbides manufactured according to the process of the invention consists of a selected transition metal carbide and its boride. Also, the process according to the invention enables the manufacture of articles of high density and flexural strength and toughness by a pressureless-sintering process, whereas this could not previously be achieved even by the hot-pressing technique.

In the sintering of $B_4C$ and transition metal carbides using traditional sintering processes, the difficulty associated with obtaining high density high strength products is attributed to an extremely high sintering temperature and exaggerated grain growth that takes place during the final stage of sintering. This exaggerated grain growth is known to retard densification and to degrade mechanical properties. It is the object of the present invention to overcome these difficulties and to provide a process for sintering transition metal carbides, whereby a high density, high strength sintered product is ready obtainable by simultaneous sintering and conversion of oxides and carbides to borides which process leads to an increase in flexural strength and toughness of the product.

It has been discovered in the present invention that, when either $TiO_2$ and carbon, or titanium containing component and carbon are added to boron carbide powder, titanium boride will form according to the reaction:

$$xB_4C + 2TiO_2 + 4C \rightarrow (x-1)B_4C + 2TiB_2 + 4CO \qquad (1)$$

The amount of $TiO_2$ added to $B_4C$ is based on the desired properties of the sintered composite. If high strength and high toughness are desired for components used for advanced structural applications, the amount of $TiO_2$ should be at least 20% by weight, preferably over 30%. Also, it was found that the level of carbon added to the mixture determines the extent of conversion of $TiO_2$ to boride. For example, too high amount of carbon, normally 1 to 5% by weight above stoichiometric amount allows the formation of free carbon in the sintered born carbide bodies, whereas too little carbon, normally 2 to 3% by weight below stoichiometric amount, prevents full conversion of oxide to boride. Depending on the amount of $TiO_2$ added, the full conversion of oxide to boride is achieved when the initial carbon content is kept within the range of from about 0.1 to about 10% by weight, preferably from about 2 to about 5% by weight. Full conversion of $TiO_2$ to $TiB_2$ is essential if high density, high strength material is to be produced.

The boron carbide used in the present process advantageously has a purity of at least 98% by weight, by which is meant that the sum of the boron content and the carbon content should total at least 98%. The boron carbide powder must have a particle size distribution not exceeding 5 µm, and a specific surface area in the range from about 5 to about 100 m²/g.

Boron carbide powder may be crystalline or amorphous. It may be obtained by precipitation from the gaseous phase or by the reduction of boric acid with carbon in an electric furnace.

The titanium oxide powder used in the present process advantageously has purity of at least 95% by weight, by which is meant that the sum of the titanium content and the oxygen content should total at least 95%. Metallic oxides such as $ZrO_2$, $HfO_2$ and other oxides can be tolerated up to 50% by weight. The titanium oxide powder must have a particle size not exceeding 20 µm, preferably not exceeding 5 µm.

Similarly, it has been discovered in the present invention that when titanium oxide and either boron carbide, elemental boron, or any boron containing compound is added to titanium carbide powder, titanium diboride will form according to the reaction:

$$xTiC + TiO_2 + B_4C \rightarrow (x-1)TiC + 2TiB_2 + 2CO \qquad (2)$$

The amount of $B_4C$ added to titanium carbide matrix is determined based on the desired properties of the sintered TiC. For example, if high strength, high toughness is required, the amount of $B_4C$ added to TiC should be higher than 8% by weight, preferably higher than 12%. If lower strength and lower toughness is acceptable, smaller amount of $B_4C$ can be added to TiC. For example, for applications where the resistance to wear is the only requirement, the amount of $B_4C$ added can be below 8% by weight, or as low as 0.1%. The boron carbide used as an additive has a purity of at least 95% by weight, preferably 98%. To achieve homogeneous distribution of $B_4C$ in the mixture, the boron carbide powder should have a particle size not exceeding 10 µm, preferably not exceeding 5 µm.

The level of titanium oxide ($TiO_2$) added to TiC is directly related to the level of $B_4C$ in the mixture. According to the reaction (2), for every mole of $B_4C$ present in the titanium carbide mixture, one mole of $TiO_2$ must be added. The amount of $TiO_2$ added to the mixture is critical in controlling the conversion of $B_4C$ into titanium diboride ($TiB_2$) phase. Too high amount of $TiO_2$ present in the mixture (above the stoichiometric amount as described by reaction (2)) may leave large amount of unreacted $TiO_2$ in the sintered body, in which case lower grade TiC is produced. Too low amount of $TiO_2$ will cause the formation of excess carbon in the sintered TiC body, in which case three phase system is produced, consisting of TiC, $TiB_2$, and carbon phase.

The titanium carbide used in the present process as a matrix phase advantageously has a purity of at least 95% by weight, preferably 98%. The titanium carbide powder must have a particle size distribution not exceeding 5 µm, preferably not exceeding 1 µm. The specific surface area may also be used as a measure of the fineness of the titanium carbide powder. According to the present invention, titanium carbide powder having a specific surface area within the range of from about 2 to about 50 m²/g is preferably used.

Another carbide from the transition metal carbide group that can be sintered using the present process is the tungsten carbide (WC). It has been found in the present invention that, when born carbide and tungsten three oxide (W₃), or any other tungsten oxide, or tungsten containing compound is added to tungsten carbide powder, tungsten boride will form according to the reaction:

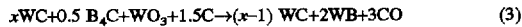

$$xWC+0.5\ B_4C+WO_3+1.5C \rightarrow (x-1)\ WC+2WB+3CO \quad (3)$$

$$x\ WC+4\ B_4C+5\ WO_3 \rightarrow (x-11)\ WC+16\ WB+15\ CO \quad (4)$$

The tungsten carbide used in the present invention advantageously has a purity of at least 95% by weight preferably 98%. Tungsten carbide powder may be amorphous or crystalline, it can be in a nanocrystalline form, which is meant that the particle size of WC is within the range of from about 10 to about 100 nm. The specific surface area of tungsten carbide powder should be within the range of from 0.1 to 15 m²/g, preferably within 0.5 to 5 m²/g.

The tungsten oxide component may be introduced into the mixture either as tungsten oxide or amoniumparatungstate compound. If amoniumparatungstate compound is used as a source of tungsten oxide, the mixture must be soaked at high temperature, preferably above approximately 900° C. in order to remove water. The role of tungsten oxide addition is to provide the vehicle for the removal of excess carbon from the system. It has been discovered in the present invention that, at high temperature, the boron carbide component reacts with tungsten carbide and forms tungsten boride phase. Simultaneously with the formation of tungsten boride, carbon is liberated both from tungsten carbide and from boron carbide component. If reaction of boride formation is carried out without the addition of tungsten oxide component, substantial amount of free carbon will remain in the sintered body, leading to degradation of mechanical and other properties. Too high amount of tungsten oxide added to the mixture will produce large amount of unreacted tungsten oxide in the form of a separate phase and this will have negative effect on room and high temperature mechanical properties of the sintered body. The amount of tungsten oxide added to the mixture depends upon the desired amount of tungsten boride phase which, in turn, depends on the amount of boron carbide added. Typically, the amount of tungsten oxide additive should be in the range of from about 1 to about 30% by weight, preferably from about 4 to about 7%. The particle size distribution of the tungsten oxide powder should be in the range of from about 0.1 to about 10 μm, preferably from about 1 to about 5 μm.

Similarly, the present process can be used to sinter to high density any of the transition metal carbides by mixing the selected transition metal carbide with its oxide, boron carbide or boron containing component and carbon, and subsequently reacting and sintering the mixture at high temperature to produce densed sintered body. The major advantage of the present process over conventional processes is that the reaction of boride formation is followed by the decomposition of the primary carbide phase as well as the oxide and boride containing phase forming an extremely fine and active powders. The decomposition reaction also provides the condition for greatly enhanced diffusion at the grain boundaries as well as particle sliding required for densification. The primary condition for successful sintering using the present process is that the affinity of boron for a transition metal must be higher than the affinity of carbon for a transition metal.

The transition metal carbide has first to be mixed with oxide and carbon containing components. In carrying out the present process, carbon component can be introduced into the mixture either as carbon black or acetylene black, or as carbonaceous organic material. If the carbonaceous organic material is a solid, it is preferably admixed in the form of a solution with the transition metal carbide and its oxide to substantially coat the particles. The wet mixture can than be treated to remove the solvent and the resultant dry mixture can be heated to decompose the carbonaceous material producing free carbon in-situ before the mixture is formed into a green body.

If carbon black or acetylene black is used, a number of dry or wet milling techniques can be used to achieve uniform distribution of the components. In both cases, it is advantageous to use a small amount of binder in the mixture, for example, polyvinyl alcohol, stearic acid, or polyethylene glycol in an amount of up to 10% by volume, preferably up to 2%.

A number of techniques can be used to shape the powder mixture into a green body. For example, the powder mixture can be extruded, uniaxially mechanically pressed, injection moulded, isostatically pressed, or slip cast to produce the green body of desired shape.

The green body to be sintered may be accommodated in a container made of graphite, boron carbide, titanium boride or any transition metal carbide which is introduced into the heating zone of a high temperature furnace provided with means to control the furnace atmosphere and temperature level. If sintering is carried out in a gas atmosphere, it can be done at pressures ranging from about 0.05 MPa to about 10 MPa. Suitable gases for this purpose are hydrogen, nitrogen, carbon monoxide and inert gases, for example, argon or helium. Preferably, however, sintering is carried out in an inert gas atmosphere.

Sintering of the transition metal carbide can be done in conventional high temperature furnaces, i.e. in a graphite-resistance furnace, or induction-heating furnace or, for continuous operation a pusher or band-type furnace. The heating program used (i.e. the rates of heating and cooling and the isothermal hold at specific temperature) depends on the size of the articles to be sintered. Small articles are relatively insensitive to the temperature program and can be heated to sintering temperature fairly rapidly, that is over a period of 45 to 60 minutes and may be maintained at sintering temperature for a period of about 15 minutes to about 30 minutes. Larger articles require much longer heating programs in order to avoid gradients and to provide sufficient time for organic binders and lubricants to burn out. For example, an article weighing 50 grams or over may be heated to 450° C. with the rates ranging from 1° to 8° C./min. From 1550° C., heating rate can vary from about 2° to about 20° C. and from 1550° C. to sintering temperature the rates can vary from about 2° to about 15° C./min. Dwelling at approximately 450° C. is normally employed to remove binders and lubricants. Dwelling time at 450° C. depends on the size of the article and can vary from about 15 minutes for small articles, to about 120 minutes for larger articles. Another dwelling is employed at temperatures ranging from 1450° C. which is required to provide a time to initiate the reaction of boride formation and to remove the CO gas from the article. This dwelling time can range from about 15 minutes to about 180 minutes depending on the type of transition metal carbide and on the size of the article. Too short a dwell may not allow complete conversion of the oxide into boride and the presence of oxide may have negative effect on both the densification and on mechanical properties of the sintered body. The dwell time at sintering temperature depends on the size and shape of the article, but dwell time within the range of from about 10 to about 120 minutes are generally sufficient to achieve densities of at least 95% of theoretical density for the selected mixture. The shaped green body is advantageously sintered at a temperature within the range of from about 1800° C. to about 2200° C. It has been found that, if sintering of the green body is done at a temperature higher than about 2100° C. its strength properties are poorer because a very coarse microstructure is developed at such high temperature. Thus, the sintering is advantageously done at temperatures in the range of from about 1950° C. to about 2050° C.

The sintered articles produced according to the process of the invention have densities of at least 95% of theoretical density for the selected composite, preferably at least 99%, and generally have a flexural strength of at least 350 MPa, preferably at least 600 MPa. The presence of separate boride phase has the role of providing fine-grained matrix microstructure (with an average grain size of less than 20 μm often less than 10 μm) and enhancing the mechanical strength and toughness.

As will be recognized by those skilled in the art, heating regime may be adjusted based on furnace load and the transition metal carbide used. Transition metal carbide bodies which have been pressureless or pressure sintered with the external pressure in the range of from 0.05 MPa to 10 MPa, can optimally be hot pressed or hot-isostatically pressed (HIPed) to improve their density and strength.

The process and products of this invention are explained in detailed in the following examples which are illustrative only. Those skilled in the art will recognize that there are numerous modifications and variations and the present invention is not limited to such examples. All parts and percentages are by weight, unless otherwise stated.

EXAMPLE 1–3

Boron carbide powder (93.5–72.4 grams) having particle size of about 1 μm, and purity above 98.5%, titanium oxide (5–22.5 grams) above 99% pure, and carbon black (1.5–5.1 grams) were mixed for 6 hours in a plastic jar with 150 milliliters (ml) of methanol, 5 ml of polyethylene glycol and 500 grams of zirconia grinding media. The slurry was dried in a dryer at 75° C. for 12 hours. The powder mixture was dry screened to –40 mesh before uniaxially pressing at 50 MPa, followed by cold isostatic pressing at 250 MPa. The rectangular shape specimens (35×16×8 mm) were placed in a graphite crucible and sintered in a stationary argon gas atmosphere at temperatures in the range of from 1900° C. to 2050° C. for one hour.

The rate of heating was as follows: 4° C./min to 450° C., 15° C./min from 450° C. to 1450° C., and 10° C./min from 1450° C. to sintering temperature. Properties of sintered samples are given in Table 1.

Detailed optical microscopy and x-ray analysis have shown the presence of only two distinct phases, namely the boron carbide phase and titanium diboride phase. No traces of titanium oxide phase were detected.

The results in Table 1 also show that as the amount of $TiO_2$ phase is increased, the flexural strength of the sintered body is increased, giving the highest value for samples containing 22.5% $TiO_2$.

The average grain size of the boron carbide phase was between 5 and 20 μm and titanium boride phase between 5 and 50 μm.

EXAMPLES 4–6

Titanium carbide (134–154 grams) having particle size of about 0.8 μm and purity of over 99.5%. $TiO_2$ (30–42 grams) above 99% pure, and $B_4C$ (16–24 grams) were mixed for 6 hours in a plastic jar with 300 ml of methanol, 10 ml polyethylene glycol and 1000 grams of zirconia grinding media. The slurry was dried in a dryer for 12 hours at 75° C. The powder mixture was dry screened to –40 mesh before uniaxially pressing at 50 MPa, followed by cold isostatic pressing at 250 MPa. The rectangular shape specimens were placed in a graphite crucible and sintered at temperatures between 1800° C. and 2000° C. for one hour. The rate of heating was as in Examples 1–3. Properties of sintered samples are given in Table 2

Optical microscopy and x-ray analysis have shown the presence of two separate phases, namely a grey matrix phase and a bright $TiB_2$ phase. Comparison of Examples 4,5 and 6 shows that higher flexural strength is achieved when higher amount of $TiO_2$ phase is used.

Examples 8–14

Tungsten carbide powder (220.6 grams), having an average particle size of about 1 μm, purity above 99%, boron carbide powder (1.6 grams) having an average particle size of about 1 μm and purity above 98.5%, tungsten oxide powder ($WO_3$) (13.42 grams) having an average particle size of less then 5 μm and purity above 98%, and carbon black (1.04 grams) having an average particle size of less than 1 μm were mixed for 6 hours in a plastic jar with 300 grams of zirconia grinding media. The slurry was dried in a dryer over night at 75° C. The powder mixture was dry screened to –40 mesh before uniaxially pressing at 50 MPa, followed by cold isostatic pressing at 250 MPa. The rectangular shape specimens (35×16×18 mm) were placed in a graphite container and sintered at temperature ranging from 1900° C. to 2000° C. for one hour. The rate of heating was as follows: 4° C./min to 450° C. with holding at 450° C. for 30 minutes, 15° C./min to 1550° C. with holding at 1550° C. for one hour, and 10° C./min to sintering temperature. Properties of sintered samples are given in Table 3.

Detailed examination of Table 3 shows that the optimum temperature for the sintering of WC powder is approximately 1930° C.

Numerous variations and modifications of the invention will be recognized by those skilled in the art. For example, pure elements or compounds containing W, Ti and oxygen could be substituted for $WO_3$, $TiO_2$ or any other transition metal oxide and still provide the condition for densification and conversion to borides. Also, any form of transition metal carbide and oxide can be used in the present invention.

The present invention is unique in that it provides a process for sintering of boron carbide and transition metal carbides by converting boron carbide, transition metal carbides and their oxides into borides in one step operation. This in-situ conversion of carbides and oxides to borides provides additional driving force for sintering not available by conventional processes. Also, it eliminates the use of expensive reinforcing boride agent and does not require expensive hot-pressing techniques.

What is claimed is:

1. A process for the manufacture of high strength, high density, sintered shaped articles of transition metal carbides by partial conversion of transition metal carbides to borides and full conversion of transition metal oxides to borides, comprising (I) Forming a homogeneous mixture consisting of (a) boron carbide, from about 1% to about 50% by weight of titanium oxide, and from about 0.1% to about 10% by weight of carbon when sintering boron carbide powder, and (b) any transition metal carbide, from 0% to about 30% by weight of transition metal oxide, from about 0.1% to about 40% by weight of boron carbide, and from about 0.1% to about 10% by weight of carbon based on the total amount of transition metal carbide (ii) Molding and shaping the mixture into a green body having a density of at least 50% of theoretical density of the composite, and (iii) Sintering the green body in a reducing or inert (to the transition carbide) atmosphere, or in vacuum at a temperature within the range of from about 1800° C. to about 2100° C. to form an article having a density of at least 95% of the theoretical density of transition metal carbide-boride.

2. An article as claimed in claim 1, that contains from 0.1 to 50% by weight of boride phase.

3. An article as claimed in claim 1 or 2, that has a density of at least 99% of the theoretical density of the mixture.

4. An article as claimed in claim 1 or 2, that has a flexural strength of at least 450 MPa.

5. An article as claimed in claim 1 or 2, that has fracture toughness of at least 8 MPa.m$^{1/2}$.

* * * * *